United States Patent [19]

Mino et al.

[11] Patent Number: 5,188,459
[45] Date of Patent: Feb. 23, 1993

[54] PROTECTIVE SHIELD ACCESSORY FOR MEASUREMENT INSTRUMENT

[75] Inventors: Kazuo Mino, Kitakatsuragi; Toshiyuki Nomura; Yuiji Tsujioka, both of Nishigyo, all of Japan

[73] Assignees: Horiba, Ltd., Kyoto; Tasco Japan Co., Ltd., Osaka, both of Japan

[21] Appl. No.: 797,906

[22] Filed: Nov. 26, 1991

[30] Foreign Application Priority Data

Nov. 29, 1990 [JP] Japan .................. 2-333566

[51] Int. Cl.⁵ .................................. G01K 1/08
[52] U.S. Cl. .................. 374/158; 206/306; 250/338.1; 374/124; 374/209
[58] Field of Search .......... 374/158, 209, 208, 124; 206/306; 73/300, 431; 250/338.1

[56] References Cited

U.S. PATENT DOCUMENTS

| | | | |
|---|---|---|---|
| 3,703,892 | 11/1972 | Meyers | 206/306 X |
| 3,942,891 | 3/1976 | Spielberger et al. | 356/44 X |
| 4,052,899 | 10/1977 | Longhetto | 73/300 |
| 4,341,992 | 7/1982 | Goldstein | 374/158 |
| 4,895,164 | 1/1990 | Wood | 374/124 X |
| 5,018,872 | 5/1991 | Suszynski et al. | 374/208 X |
| 5,066,142 | 11/1991 | DeFrank | 374/208 |
| 5,088,834 | 2/1992 | Howe et al. | 374/158 |

Primary Examiner—Daniel M. Yasich
Attorney, Agent, or Firm—Price, Gess & Ubell

[57] ABSTRACT

A measuring instrument for receiving radiation through an opening in a housing and having a protective shield member across the opening. The protective shield member is sealed against the housing to project a flexible contact portion at above ambient pressure for contacting and conforming to the surface of an object. A flexible dome on the protective shield member can pump air into the protective shield member to provide the desired internal pressure. The protective shield member is relatively thin and reaches thermal equilibrium with the object in a relatively short period of time, when the measuring instrument is a radiation thermometer.

19 Claims, 2 Drawing Sheets

PROTECTIVE SHIELD ACCESSORY FOR MEASUREMENT INSTRUMENT

BACKGROUND OF THE INVENTION

1. Field of the Invention

The present invention relates to a measurement instrument, such as a radiation thermometer used in the measurement of a temperature of an object and, more particularly, to a protective shield that can conform to the surface of the object while protecting the object from the measurement instrument.

2. Description of Related Art

In the field of measurement instrumentation, there is sometimes a concern to protect an object to be measured from the measurement instrument. For example, in the field of radiation thermometers, it is frequently desired to use a radiation thermometer to measure the actual temperature of a highly polished metallic surface that can have a high gloss and will exhibit a low infrared emissivity. For example, the surface of a mold can be subject to a polishing treatment to ensure that an extremely smooth surface will be provided on the molded object. In the manufacturing of plastic lenses optical surfaces have to be carefully prepared. Thus, in plastic resin metal molds, glossy metal surfaces can be frequently found.

If a contact-type thermometer using a thermocouple came into contact with a glossy metal surface, it can mar or scratch such a surface to the detriment of the resulting molded product. Accordingly, a non-contact-type radiation thermometer is frequently recommended. The use of such a radiation thermometer can create another problem, however, in that a glossy metal surface can exhibit a low emissivity factor and can provide an erroneous reading. Attempts have been made to address this specific problem by attaching a black tape or black paint to the surface of the mold to provide a surface test area to enable an indirect measurement of the temperature of the object on the basis of a radiation dosage and an emissivity of infrared rays from the test area of the black tape or black paint when it is brought into a thermal equilibrium with the object to be measured.

As can be readily appreciated, however, the initial desire not to contact or mar the surface is compromised with a troublesome operation of sticking the tape onto the object or, alternatively, applying the black paint to prepare the test surface. Subsequent to the measurement operation, there is the additional problem of separating the tape or the paint from the test surface and, of course, there is always the possibility that the glossy metallic surface can be marred, injured or scratched when the tape or the paint is removed.

Thus, there is still a desire in the prior art to improve the method and apparatus of enabling a measurement of a temperature of a glossy metal surface with a high degree of accuracy.

SUMMARY OF THE INVENTION

It is an object of the present invention to provide a protective shield accessory to protect the interface between a measurement surface and a measuring instrument.

It is a further object of the present invention to provide a radiation thermometer with a protective shield accessory which can apply a thin film portion of the accessory in a positive manner to a surface of an object to be measured.

It is an additional object of the present invention to permit the measurement of a temperature of an object with a non-contact thermometer to be measured with high accuracy, even though a minimum measurement spot is relatively large.

The present invention includes a radiation thermometer that can be provided with an infrared radiation protective accessory having a cross-sectional shaped convex configuration of a flexible resilient material. A portion of the tip of the convex shield crossing an optical axis of the thermometer is formed with a relatively thin film of a relatively constant thickness. The chamber between the radiation thermometer and the convex envelope of the protective shield can be airtight and can be pressurized to provide an increased pressure over that of the ambient pressure.

The protective shield assembly can be further provided with integral sealing rims and a peripheral pressurizing chamber that enables an air intake for selectively increasing the internal pressure within the chamber. A convexed or domed shaped configuration can be provided on the protective shield to form with an exterior portion of the radiation thermometer, a manually pumpable structure to force air through the annular rim seals into the pressurized chamber in a sequential manner.

By increasing the pressure within the protective shield accessory, a high degree of resiliency can be subjectively determined by the operator to the protective shield. As a result, the thin film portion of the protective shield can adhere to the surface of the object to be measured when it is pressed against the surface of the object, even though an area of the thin film portion may be relatively large compared to the measuring spot.

As can also be appreciated, if excessive pressure is produced within the protective shield, the resiliency of the protective shield and a port that is functionally related with the dome portion would permit the release of any air pressure in excess of the sealing pressure of the flanges against a housing of the radiation thermometer. When it is desired to pump air into the protective shield the port communicating with the dome can be closed as the dome is collapsed to forced air over the sealing flanges.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a more producible protection shield.

Figure 1:
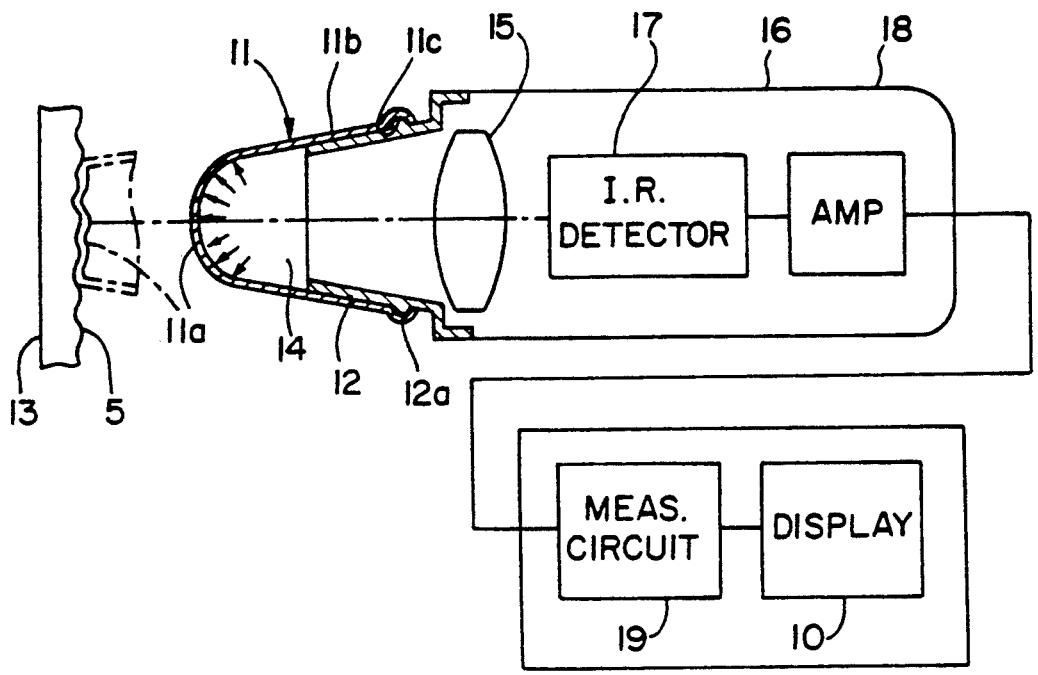
FIG. 1 is a longitudinal partially schematic cross-sectional side view of a radiation thermometer having a protective shield in accordance with a first preferred form of the present invention.

Referring to Fig. 1, a radiation thermometer assembly in accordance with a first preferred embodiment of the present invention is disclosed. A protective shield 11 is removably mounted on an entrance hood or barrel 12 of the radiation thermometer instrument. The hood member 12 extends immediately forward from an optical system, such as a collecting lens 15. The protective shield member is preferably molded from a heat-resisting elastic material, such as silicon rubber and has a cross-sectional shape which is convexed toward the side of the object to be measured. Such an object is schematically shown as element 13, having an irregular surface S. The protective shield member 11 includes a thin film distal portion 11a that crosses the optical axis P of the radiation thermometer. This thin film portion 11a is integrally joint with a circumferential portion 11b, dimensioned to be elastically engaged with the exterior surface of the hood 12. The inside diameter of the circumferential portion 11b is slightly smaller than the outside diameter of the hood 12. When the protective shield 11 is mounted on the hood 12, an airtight chamber 14 is formed at the end of the hood 12. In installing the protective shield 11, air pressure can be increased in the chamber 14, as the protective shield 11 is progressively and sealingly slid backward over the outside surface of the hood 12 to engage a rim or circular portion 12a formed in the outer circumferential surface of the hood 12. As a result of this engagement, sufficient pressure is generated within the chamber 14 and the protective shield 11 is securely fastened to the hood 12.

Besides the collecting lens 15, an infrared detector 17 can be mounted within the body 16 of the radiation thermometer. The infrared detector is appropriately connected to an amplifier circuit 18 for amplifying the measured signal provided by the infrared detector 17. Measurement circuit 19 can calculate the temperature of the object in a known manner on the basis of the amplified measurement signal and in the vicinity of the protective shield member 11. Reference number 10 designates the display for displaying the calculated temperature.

Figure 2:
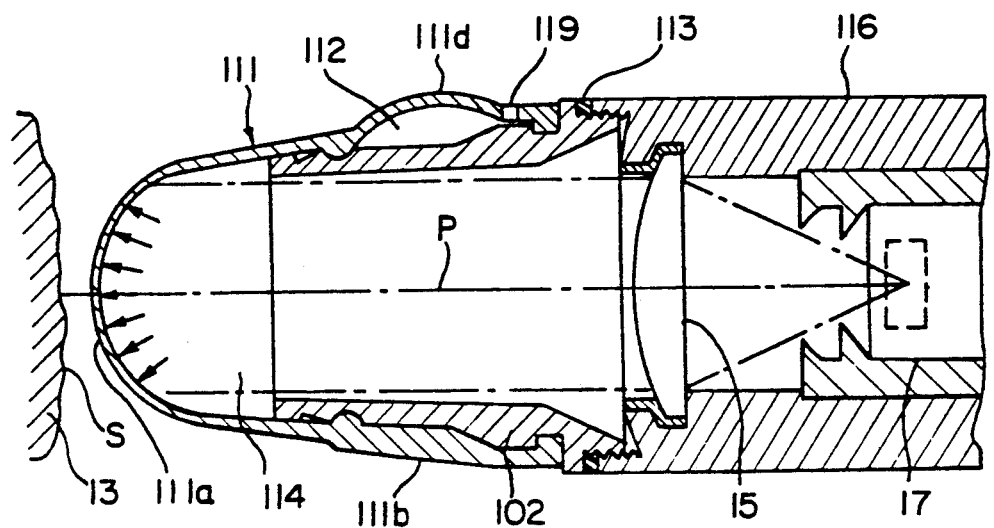
FIG. 2 is a partially schematic cross-sectional view of a portion of the radiation thermometer and a protective shield of a second embodiment of the present invention.

In accordance with the first preferred embodiment of the present invention, the internal pressure that is created within the chamber 14 is higher than the pressure of the ambient air (as shown by multiple arrows indicating an output pressure force in FIGS. 1 and 2) and when the thin film portion 11a of the protective shield is pressed against the object 3, this internal pressure will ensure that the thin film section 11a closely adheres or conforms to the surface S of the object to be measured. Additionally, since a thin film portion 11a is applied to the surface, thermal equilibrium can be quickly obtained to enable a temperature reading. Thus, this close adhesion of the thin film 11a the surface S ensures that it will quickly, through conduction and convection, attain the object surface temperature, even in a case where the minimum measurable spot that is desired to be measured by the radiation thermometer is relatively large about the optical axis.

Figure 3:
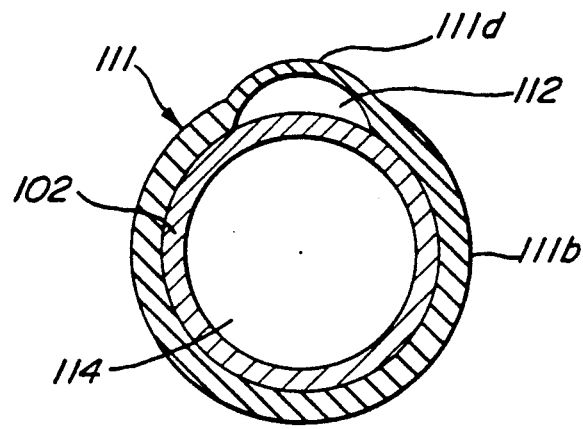
FIG. 3 is a traverse cross-sectional view relative to the disclosure of FIG. 2, and FIG. 4a and FIG. 4b are respective schematic illustrations of a method of introducing pressurized air into the protective shield.

FIGS. 2 and 3 disclose another embodiment of the present invention. In this embodiment, the protective shield 111 is further altered, particularly in its peripheral portion 111b to provide a pressurizing chamber 112 with an air intake port 119. This pressurizing chamber 112 or dome is capable of being pumped to subjectively increase the internal pressure within the air chamber 114. An internal flange or rim adjacent the forward edge of the pressurizing chamber 112 can further act in a sealing member with an outer circumferential groove on a protective hood 102.

As can be seen in FIG. 2, the hood 102 includes an airtight packing or seal assembly 113 between the hood 102 and the body or housing 116 of the radiation thermometer. The circumferential portion of the protective shield 111 is relatively thicker than the measuring surface 111a of the protective shield 111.

While the preferred embodiment shown in FIG. 2 discloses a relatively thinner walled dome portion 111d, see FIG. 3, it can be realized that the thick walled portion 111b can be further hollowed to provide a dome cavity for creating the pumping action of air to be described subsequently. In the embodiment of FIG. 2 and FIG. 3, the thin walled dome portion 111d is further provided with an air intake port 119 to permit the egress of air into the dome chamber.

Figure 4A:
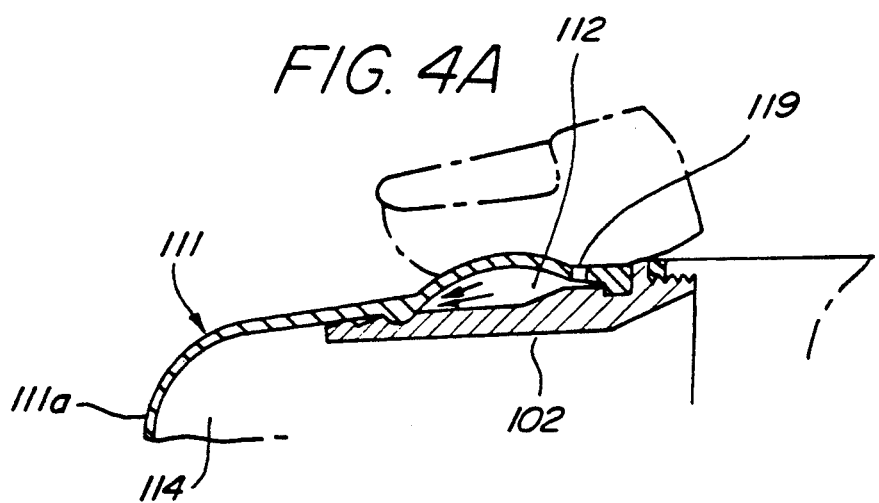
Figure 4B:
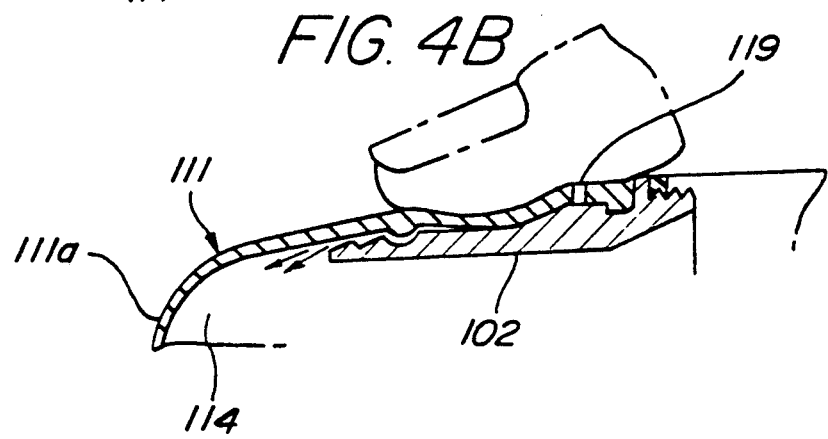

Referring to FIGS. 4a and 4b, an operator's finger can be pressed over the aperture 119 and across the pressurizing chamber 112 and force can be exerted to squeeze the dome for collapsing against the exterior surface of the hood 102. As can be seen in FIG. 4a, the exterior surface of the hood 102 can have a flat or land portion immediately underneath the aperture port 119 to assist in a sealing action. As the dome is progressively pushed, the air pressure within the dome will then unseat the flange and air will be emitted into the chamber 114. A release of the dome will then again seal the flange and permit air to enter through the aperture 119 to again fill the dome. Repetitive pumping action can subjectively increase the internal pressure within the chamber 114.

Thus, an operator can subjectively determine the amount of pressure that is desired within the chamber 114 of the protective shield 111, depending upon the particular application and surface that is to be measured. As a result of the internal pressure in the chamber 114, the thin film 111a will closely adhere to the surface S of an object to be measured over a relatively wide range about the optical axis P. Thus, the purpose of the first embodiment of the present invention is achieved, while providing the additional feature of a subjective controlling of the amount of pressurized air. As can be appreciated, if the air is gradually released, for example, through the interface of the protective shield 111 and the hood 102, or by slow transmission through the thin film 111a, the operator can easily and conveniently re-inflate the chamber 114 to the desired pressure level to enable a subsequent measurement operation. It should be appreciated that the protective shields can be disposable and accordingly not only will protect the radiation thermometer while ensuring accurate measurements, but can also be easily replaced in an economical manner.

As can be appreciated, other material than a silicon rubber can be utilized for creating a protective shield in either embodiment. The prime features are to provide an airtight sealing with the hood and utilizing material that can be quickly adapted to reach thermal equilibrium with the measurement surface without marring the same and having the capacity to emit a characteristic infrared radiation of the test object that can be readily detected by an infrared detector cell. Various modifications of the present invention are possible with regard to interface structures between the hood and the protective shield and accordingly the present invention should be measured solely from the content of the following claims wherein we claim.

What is claimed is:

1. In an improved radiation thermometer assembly having a detector mounted in a housing with an entrance aperture for receiving radiation and means for determining a temperature of an object from the detected radiation, the improvement comprising:

securing means about the entrance aperture for securing an accessory attachment, and a protective shield member, as the accessory attachment connected to the securing means, the protective shield member is resilient and air tight and has a distal portion and a circumferential portion configured to sealingly attach to the securing means to capture air at a pressure above ambient in the distal portion as the protective shield member is mounted on the securing portion so that he distal portion is displaced forward of the radiation thermometer assembly for contacting an object to be measured offset from a plane containing the entrance aperture.

2. The radiation thermometer assembly of claim 1 wherein the protecting shield member has a hollow interior with an approximately parabolic cross-sectional shape when applied to the securing means to capture air.

3. The radiation thermometer assembly of claim 1 wherein the protective shield member is formed of a silicon rubber with an approximately constant thickness.

4. The radiation thermometer assembly of claim 1 wherein the securing means further includes an annular rim.

5. The radiation thermometer assembly of claim 1 wherein the securing means has an exterior conical configuration.

6. The radiation thermometer assembly of claim 1 wherein the protective shield member includes a flexible dome for pumping air into the protective shield member.

7. The radiation thermometer assembly of claim 1 wherein the protective shield member includes means for pumping air into the protective shield member.

8. The radiation thermometer assembly of claim 7 wherein the protective shield member includes a port for communicating ambient air into the flexible dome, the port being positioned adjacent the flexible dome in such a position to be closed by a finger of an operator as the finger collapses the flexible dome in a pumping action.

9. The radiation thermometer assembly of claim 7 wherein the securing means includes annular grooves and the protective shield member includes annular rims of a configuration for mounting in the annular grooves.

10. A protective shield accessory for a measuring instrument having a housing with an aperture for receiving radiation from an object comprising:

a resilient, air tight cover member having a first contact portion extending forwardly from the aperture for flexibly contacting a surface of the object and deforming to conform to that surface and a second mounting portion for sealingly contacting the housing about the aperture as it is mounted on the housing to provide an above atmospheric pressure against the first contact portion.

11. The invention of claim 10 wherein the cover member has an approximately parabolic cross-sectional configuration.

12. The invention of claim 11 wherein the first contact portion and the second mounting portion have the same thickness.

13. The invention of claim 10 further including means for pumping air into an interior of the first contact portion.

14. The invention of claim 13 wherein the means for pumping air includes a flexible dome for pumping air into the protective shield accessory.

15. The invention of claim 14 wherein the second mounting portion includes a port for communicating ambient air into the flexible dome, the port being positioned adjacent the flexible dome in such a position to be closed by a finger of an operator as the finger collapses the flexible dome as a pumping action.

16. The invention of claim 15 further including internal annular mounting rims on either side of the dome for a sealing contact with an instrument.

17. The invention of claim 15 wherein the protective shield assembly is molded of a silicon rubber.

18. A protective shield accessory for a measuring instrument having a housing with an aperture for receiving radiation from an object comprising:

a resilient, unitary air tight cover member having a first distal contact portion of a curved configuration for extending across the aperture in a bulbous manner and for flexibly contacting a surface of the object and deforming to conform to that surface, and a second mounting portion spaced from the first distal contact portion a predetermined distance for sealingly contacting an outer surface of the housing about the aperture to provide an above atmospheric pressure about the first distal contact portion, to create the bulbous curved configuration, as it is slid along the housing to a sealed position.

19. In an improved radiation thermometer assembly having a detector mounted in a housing with an entrance aperture for receiving radiation and means for determining a temperature of an object from the detected radiation, the improvement comprising:

an annular hood member extending about and sealing the entrance aperture;

an annular portion of the hood member positioned a predetermined distance from the entrance aperture; and a unitary protective air tight shield member having a distal portion of a curved cross-sectional configuration extending across and offset from the entrance aperture and a mounting portion extending about an opening of the shield member for engagement with the annular portion of the hood, the shield member is configured relative to the annular hood member to capture air in the distal portion as it is slid across the annular hood member during mounting on the hood member so that when the mounting portion engages the annular portion of the hood member, an above atmospheric pressure extends the distal portion to a curved configuration.

* * * * *